United States Patent

Dijkman, Sr. et al.

[11] Patent Number: 5,167,891
[45] Date of Patent: Dec. 1, 1992

[54] METHOD FOR THE MANUFACTURE OF CURVED PLASTIC PIECES

[76] Inventors: Henk Dijkman, Sr.; Henk Dijkman, Jr., both of Focher Strasse 179, 5650 Solingen 19, Fed. Rep. of Germany

[21] Appl. No.: 816,835

[22] Filed: Dec. 30, 1991

Related U.S. Application Data

[63] Continuation of Ser. No. 577,893, Sep. 5, 1990, abandoned.

[30] Foreign Application Priority Data

Sep. 8, 1989 [DE] Fed. Rep. of Germany ....... 3929930

[51] Int. Cl.$^5$ .................................. B29C 53/32
[52] U.S. Cl. ...................... 264/145; 264/157; 264/174; 264/281; 264/297.8; 264/DIG. 40
[58] Field of Search .......... 264/280, 281, 295, 297.8, 264/171, 174, DIG. 40, 145, 146, 151, 157, 163; 425/DIG. 34

[56] References Cited

U.S. PATENT DOCUMENTS

| | | | |
|---|---|---|---|
| 2,071,251 | 2/1937 | Carothers | 264/203 |
| 2,392,842 | 1/1946 | Doell | 264/DIG. 40 |
| 2,432,870 | 12/1947 | Evalt | 264/DIG. 40 |
| 2,467,227 | 4/1949 | Potter et al. | 425/384 |
| 2,740,987 | 4/1956 | Moncriaff | 264/DIG. 40 |
| 3,135,646 | 6/1964 | Haydan | 264/168 |
| 3,184,795 | 5/1965 | Howell, Jr. | 425/384 |
| 3,431,337 | 3/1969 | Heimberger | 264/339 |
| 3,547,763 | 12/1970 | Hoffman, Jr. | 264/171 |
| 3,660,993 | 5/1972 | Matsui et al. | 264/171 |
| 4,074,958 | 2/1978 | Molenaar | 425/296 |
| 4,204,818 | 5/1980 | Reum | 425/296 |
| 4,271,580 | 6/1981 | King et al. | 264/320 |
| 4,434,121 | 2/1984 | Schäper | 264/339 |
| 4,854,846 | 8/1989 | Oglesby | 264/151 |

FOREIGN PATENT DOCUMENTS

| | | | |
|---|---|---|---|
| 3326858 | 11/1984 | Fed. Rep. of Germany | 264/281 |
| 3421849 | 12/1985 | Fed. Rep. of Germany | 264/281 |
| 62-13837 | 1/1987 | Japan | 264/DIG. 40 |

Primary Examiner—Jay H. Woo
Assistant Examiner—Robert B. Davis
Attorney, Agent, or Firm—Robert W. Becker & Associates

[57] ABSTRACT

In the method for the manufacture of curved plastic pieces, such as brassiere underwires, the plastic pieces are formed from hot plastic material in a selected mold and are cooled to solidify the plastic material. In the improved method, a continuous thermoplastic wire in its thermoplastically formable state is coiled into a coil and simultaneously cooled thus forming turns of a solidified coil. The turns are subsequently cut along the axis of the coil over the entire length of the coil to produce the curved plastic pieces.

8 Claims, 2 Drawing Sheets

METHOD FOR THE MANUFACTURE OF CURVED PLASTIC PIECES

This application is a continuation of application Ser. No. 577,893 filed Sep. 5, 1990, now abandoned.

BACKGROUND OF THE INVENTION

The present invention relates to a method for the manufacture of curved plastic pieces, especially brassiere underwires, in which the plastic pieces are formed from hot plastic material in a selected mold and are cooled to solidify. Furthermore, the invention relates to an apparatus for the manufacture of curved plastic pieces, especially brassiere underwires.

For the manufacture of curved plastic pieces for the use as brassiere underwires it has been a known art to use injection molds, into which the heated plastic is injected and subsequently cooled and solidified. The curved plastic piece formed in this process may be removed from the opened mold upon completion of the process. The manufacture of curved plastic pieces using injection molds is labor intensive and time consuming, and the production rate is very low.

In another manufacturing method a steel wire is coated by using a cold forming process, a process which is also labor intensive and yields unsatisfactory output rate.

It is therefore an object of the present invention to provide a simple method for the manufacture of curved plastic pieces, especially brassiere underwires, which has a high production rate, and furthermore to provide an apparatus for the manufacture of the abovementioned plastic pieces.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
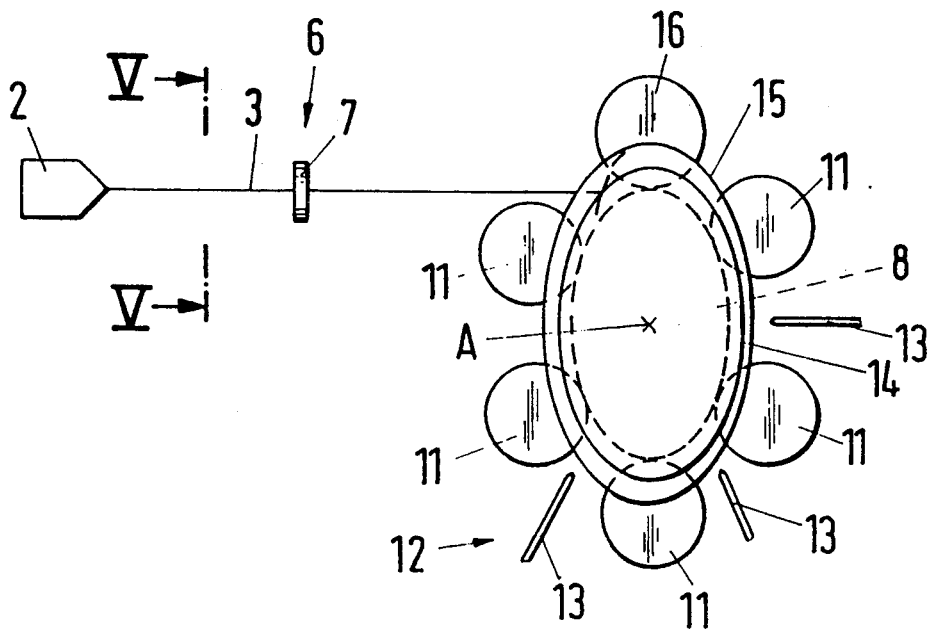
FIG. 1 is a schematic side view of the apparatus for the manufacture of curved plastic pieces.

The method of the present invention is characterized primarily by shaping a continuously fed thermoplastic wire in its thermoplastically formable state into a coil and cooling it to solidify the coiled material and subsequently cutting the formed coil into single, curved plastic pieces.

With this method a continuous process for the manufacture of curved plastic pieces, especially for the manufacture of brassiere underwires, is provided. While still in its heated, formable state, the plastic wire is shaped into the coil. The cross-section of the coil is adjusted to the curvature of the future plastic piece. Usually, the cross-section of the coil is eccentric, for example, oval. If the plastic pieces are curved in a partial circular shape, the cross-section of the coil is a circle. An elastic coil is formed due to the elastic properties of the plastic wire, from which the single curved plastic pieces are manufactured by cutting the turns of the coil. For example, the coil is cut at two opposite sides of the turn, parallel to the coil axis, whereby the plastic pieces are automatically formed. Thereby an economical method for the manufacture of curved plastic pieces is provided which yields a high production rate.

Preferably, the continuous plastic wire is supplied by an extrusion apparatus which is used for the manufacture of the plastic wire, so that the plastic wire is still in its heated state and may be further processed, so that a continuous production process is possible.

In order to solidify the plastic wire in the desired coil shape, it is cooled by spraying it with water.

In a preferred embodiment at least one plastic wire core, preferably two plastic wire cores, are used as the continuous plastic wire, which are then coated with a plastic coating. The plastic wire core or the two plastic wire cores therefore are the carrier material for the plastic coating. Such a plastic wire may be produced in an extrusion apparatus by a simple technical process, whereby the plastic wire core or the plastic wire cores are introduced into the extrusion apparatus and the coating step is carried out in the extrusion apparatus. By carefully selecting the materials to be used, the properties of the resulting plastic wire may be predetermined as desired.

Preferably, the plastic wire core used is a polyester material. Polyester monofilaments are especially suited for curved plastic pieces with high elastic and shape restoring properties.

When two plastic wire cores are used, the plastic wire core on the outer side of the curvature is preferably thicker than the one on the inner side of the curvature. The diameter of the outer plastic wire core may be approximately 1.2 mm and the diameter of the inner plastic wire core may be approximately 0.7 mm, so that the resulting plastic wire has a cross-section of approximately 3 ×2 mm.

The plastic coating is preferably made from polyacetal resin or polycarbonate. The polycarbonate is commercially available under the name "Makrolon". The materials mentioned above yield a curved plastic piece with very high restoring and elastic properties.

The apparatus of the present invention is primarily characterized by a coil form, rotating about its axis, with a mantle surface of a circumference profile, adapted to the desired curvature shape of the curved plastic piece. The continuous thermoplastic wire, in its thermoplastically formable state, is coiled onto the mantle surface. A cooling device arranged at the coil form is provided for the cooling of the plastic wire during the coiling process, so that the plastic wire is transformed into a solidified coil. The turns of the coil are subsequently cut into the single, curved plastic pieces.

Thereby a technically simple apparatus for the manufacture of curved plastic pieces, especially brassiere underwires, is provided, with which the plastic wire is first formed into a continuous coil with a coil form. Of course, the coil form may be replaced by other equivalent means. The only requirement is that the cross-section of the coil form is adapted to the curvature of the future curved plastic piece and, in particular, is of an eccentric, for example, oval, shape. The curved plastic pieces may then be finally cut from the turns of the curved coil-shaped wire.

Preferably the coil form is arranged close to the outlet of the extrusion apparatus for the manufacture of the plastic wire. The advantage of such an arrangement is that the plastic wire, after leaving the extrusion apparatus, is still hot and may be shaped into a coil without problems. The coil form is preferably equipped with an feed device in the form of two parallel, free spinning rollers, which guide the plastic wire between them. Such a feed device is advantageous because the hot plastic wire may be fed in a exact position onto the coil form.

In order to exactly guide the plastic wire about the coil form, the coil form, in a further embodiment, is equipped with a receiving groove for the plastic wire at the circumference of the coil form. Such a receiving groove is an optimal guide for the plastic wire on the coil form.

In a further embodiment a circular separating tool, which runs about the circumference of the coil form in a free spinning manner, is arranged between the feed position of the hot plastic wire at the coil form and the exiting position of the solidified, coil shaped plastic wire. Thereby the finished coil may be separated easily from the plastic wire still being coiled at the circumference of the coil form.

In order to assure a close contact of the plastic wire at the mantle surface of the coil form and thereby achieve the desired cross-section of the coil, press rollers are provided preferably at the circumference of the coil form. The press rollers press the plastic wire onto the mantle surface of the coil form. For this action, they are equipped with springs, which allow the rollers to be evenly pressed onto the plastic wire at every position on the eccentric circumference of the coil form.

As a cooling device water conduits are arranged preferably at t he circumference of the coil form. They provide a continuous and fast cool down of the plastic material during the coiling step.

In a preferred embodiment of the present invention an elongated roller for the reception of the produced coil is arranged at the face of the coil form. The produced coil is collected on this roller and may be removed when needed.

In a further embodiment at least two cutting edge pairs, which are parallel to the coil axis, are provided for the cutting of the turns of the plastic wire coil, thereby assuring a technically simple cutting of the turns of the coil at the respective locations in order to produce the final curved plastic pieces.

DESCRIPTION OF PREFERRED EMBODIMENTS

The present invention will now be described in detail with the aid of several specific embodiments represented in the FIGS. 1 to 5.

Figure 2:
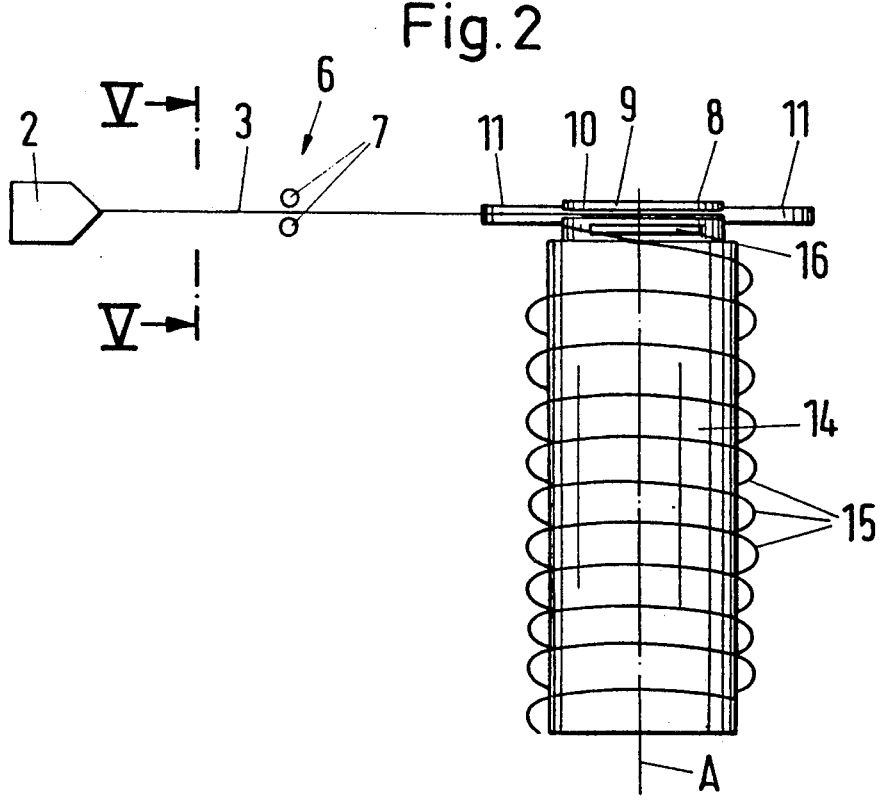
FIG. 2 is a top view of the apparatus of FIG. 1.
Figure 5:
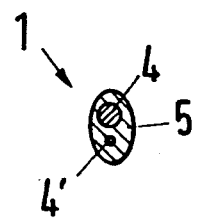
FIG. 5 is an enlarged cross-sectional view along the lines V—V in FIG. 1, 2 and 4.

The apparatus for the manufacture of curved plastic pieces 1 in the form of brassiere underwires comprises an extrusion apparatus 2 which is only shown schematically in the FIGS. 1 and 2. The extrusion apparatus produces a plastic wire 3 which is used for the manufacture of the brassiere underwire 1. A cross-section of such a plastic wire 3 is represented in FIG. 5. It comprises two plastic wire cores 4 and 4' which are coated with a plastic coating 5. The two plastic wire cores 4 and 4' consist of polyester monofilaments having a diameter of 1.2 mm and 0.7 mm respectively. The thicker plastic wire core 4 is later arranged at the outer curvature of the curved plastic piece. The manufacture of the plastic wire 3 in the extrusion apparatus 2 is performed such that the two plastic wire cores 4 and 4' are introduced as semiproducts into the extrusion apparatus, which then applies the plastic coating 5.

After passing through a feed device 6 in the form of two parallel free spinning rollers 7, the still hot thermoplastic wire is introduced into the apparatus for the actual manufacture of the curved plastic pieces 1. The apparatus comprises a coil form 8, which is rotated about an axis A by a motor not represented in the drawings. The coil form has a non-circular cross-sectional shape and is essentially either eccentric or oval. The curvature of the outer mantle surface 9 is adapted to the curvature of the future curved plastic piece 1. The circumference of the coil form 8, on the outer mantle surface, is equipped with a receiving groove 10. The hot plastic wire 3, coming from the extrusion apparatus 2, is guided in the groove 10 for almost a full rotation about the circumference of the coil form 8.

In order to hold the plastic wire 3 close to the mantle surface 9 of the coil form 8, three rotating press rollers 11 are provided at the circumference of the coil form 8, which hold the plastic wire between their outer mantle surface and the mantle surface 9. The press rollers are equipped with springs in such a manner (not shown in the drawings) so that they follow the eccentric circumference of the coil form 8, whereby the press rollers 11 press against the mantle surface 9 of the coil form 8 at all times.

There is also a cooling device 12 provided at the coil form 8, which, in the preferred embodiment of FIG. 1, comprises three water conduits 13 leading to the mantle surface area 9 of the coil form 8. The plastic wire 3 is cooled by the water exiting from the water conduits 13 so that it solidifies at the circumference of the coil form 8 and thereby adapts the shape of the mantle surface 9.

At the face of the coil form 8 a roller 14 of a respective eccentric cross-section is attached. This roller 14 rotates with the coil form 8 and serves as a receiver for the coil 15, which consists of the solidified plastic wire 3. At the interface of the coil form 8 and the roller 14 a circular separating tool 16 is provided, which freely rolls on the mantle surface 9 of the coil form 8 and thereby guides the solidified plastic wire 3, after an almost complete rotation around the coil form 8, onto the roller 14.

As shown in FIG. 2, the diameter of the roller 14 is somewhat smaller than the diameter of the coil form 8 so that the solidified plastic wire 3 does not open its configuration after leaving the coil form 8.

Figure 3:
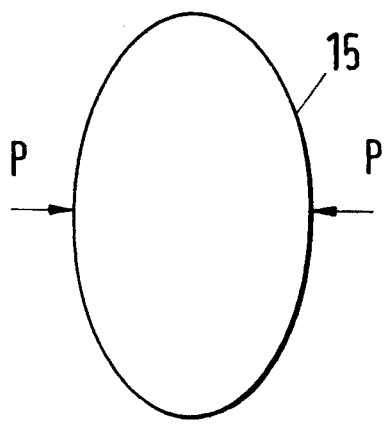
FIG. 3 is an axial cross-sectional view of a coil manufactured with the apparatus according to FIGS. 1 and 2.
Figure 4:
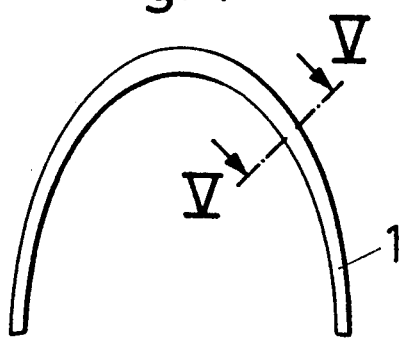
FIG. 4 is a view of a single, curved plastic piece.

As soon as the coil 15 achieves a certain length on the roller 14, the plastic wire 3 is cut in the area of the coil form 8 as to remove the coil 15 from the roller 14. The formation of the coil is not interrupted during this step, the coil form 8 rotates without shut-down. The coil 15 is schematically represented in FIG. 3. The coil 15 may now be used to produce the curved plastic pieces 1 by cutting the coil turns in the area of the arrows P. This may be achieved by cutting edge pairs, not represented in the FIG. 3, whereby the coil is cut in its full length. A curved plastic piece 1 produced by this method is shown in an enlarged view in FIG. 4. The curved plastic piece 1 has high restoring and elastic properties due to the plastic materials chosen for its manufacture.

The present invention is, of course, in no way restricted to the specific disclosure of the specification, examples and drawings, but also encompasses any modifications within the scope of the appended claims.

What we claim is:

1. A method for the manufacture of curved plastic pieces, in which said plastic pieces are formed from hot plastic material in a selected mold and are cooled to solidify said plastic material; said method further comprising the steps of:

coating two continuous thermoplastic wire cores with a plastic coating to form a continuous thermoplastic wire;

continuously coiling said continuous thermoplastic wire in its thermoplastically formable state into a coil and simultaneously cooling said thermoplastic wire thus forming turns of solidified coil; and subsequently cutting said turns at two locations that are 180° spaced from one another parallel to an axis of said coil along the entire length of said coil to produce single ones of said curved plastic pieces.

2. A method according to claim 1, in which said continuous plastic wire is directly supplied by an extrusion apparatus which produces said plastic wire.

3. A method according to claim 1, which includes the step of spraying water onto said plastic wire to cool same.

4. A method according to claim 1 in which said plastic wire core consists of polyester.

5. A method according to claim 1, in which a thicker one of said thermoplastic wire cores is disposed on the outer side of the curvature of said curved plastic piece and a thinner one of said thermoplastic wire cores is disposed on the inner side of said curvature.

6. A method according to claim 1, in which said plastic coating consists of polyacetal resin.

7. A method according to claim 1, in which said plastic coating consists of polycarbonate.

8. A method according to claim 1, in which said wire cores are extrusion-coated.

* * * * *